(12) United States Patent
Lauder

(10) Patent No.: US 10,974,824 B2
(45) Date of Patent: *Apr. 13, 2021

(54) ELECTRIC POWERED DIRECT DRIVE ROTOR MOTOR

(71) Applicant: Sikorsky Aircraft Corporation, Stratford, CT (US)

(72) Inventor: Timothy F. Lauder, Oxford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 800 days.

This patent is subject to a terminal disclaimer.

(21) Appl. No.: 15/655,670

(22) Filed: Jul. 20, 2017

(65) Prior Publication Data

US 2019/0023384 A1   Jan. 24, 2019

(51) Int. Cl.
| | | |
|---|---|---|
| *B64C 27/14* | (2006.01) | |
| *B64D 27/24* | (2006.01) | |
| *B64C 27/06* | (2006.01) | |
| *H02K 7/08* | (2006.01) | |
| *H02K 7/18* | (2006.01) | |
| *H02K 7/14* | (2006.01) | |

(Continued)

(52) U.S. Cl.
CPC .............. *B64C 27/14* (2013.01); *B64C 27/06* (2013.01); *B64C 27/12* (2013.01); *B64D 27/24* (2013.01); *H02K 7/086* (2013.01); *H02K 7/112* (2013.01); *H02K 7/14* (2013.01); *H02K 7/1807* (2013.01); *H02K 16/04* (2013.01); *H02K 21/24* (2013.01); *B64C 2027/8209* (2013.01); *H02K 7/10* (2013.01); *H02K 16/00* (2013.01)

(58) Field of Classification Search
CPC ......... B64C 27/14; B64C 27/12; B64C 27/06; B64C 2027/8209; H02K 21/24; H02K 16/04; H02K 7/112; H02K 7/14; H02K 7/1807; H02K 7/086; H02K 16/00; H02K 7/10; B64D 27/24

See application file for complete search history.

(56) References Cited

U.S. PATENT DOCUMENTS

| 853,107 A | 5/1907 | Mershon |
|---|---|---|
| 1,936,542 A | 11/1933 | Nardone |

(Continued)

FOREIGN PATENT DOCUMENTS

| CN | 1857965 A | 11/2006 |
|---|---|---|
| CN | 101244762 A | 8/2008 |

(Continued)

OTHER PUBLICATIONS

Timothy Fred Lauder, U.S. Appl. No. 15/434,951, filed Feb. 16, 2017; Non-Provisional Application Titled: Electric Propulsion System With Overrunning Clutch for a Rotary-Wing Aircraft.

(Continued)

*Primary Examiner* — Assres H Woldemaryam
(74) *Attorney, Agent, or Firm* — Baker Botts L.L.P.

(57) ABSTRACT

An electric propulsion system includes a static mast defining an axis of rotation and a stationary rotor hub assembly coupled to the static mast. A rotating system is rotatably mounted to the stationary rotor hub assembly. The electric propulsion system additionally includes an electric motor including a stator assembly associated with the rotor hub assembly and a rotor assembly associated with the rotating system.

20 Claims, 10 Drawing Sheets

(51) Int. Cl.
- H02K 7/112 (2006.01)
- H02K 16/04 (2006.01)
- B64C 27/12 (2006.01)
- H02K 21/24 (2006.01)
- H02K 7/10 (2006.01)
- H02K 16/00 (2006.01)
- B64C 27/82 (2006.01)

(56) References Cited

U.S. PATENT DOCUMENTS

| | | | |
|---|---|---|---|
| 2,665,859 A * | 1/1954 | Papadakos | B64C 27/26 244/7 R |
| 3,362,255 A | 1/1968 | De Rocca et al. | |
| 3,744,743 A * | 7/1973 | Nay | B64C 27/12 244/17.11 |
| 4,447,023 A * | 5/1984 | Reid | B64C 27/00 244/17.11 |
| 4,558,770 A | 12/1985 | Woodruff | |
| 4,690,390 A | 9/1987 | Kish | |
| 4,729,753 A | 3/1988 | Neathery et al. | |
| 4,899,957 A | 2/1990 | Eickmann | |
| 4,938,333 A | 7/1990 | Kish | |
| 5,188,511 A | 2/1993 | Ebert | |
| 5,271,295 A | 12/1993 | Marnot | |
| 5,693,896 A * | 12/1997 | Mistral | G01L 5/133 73/178 H |
| 5,749,449 A | 5/1998 | Kearney et al. | |
| 6,484,967 B2 | 11/2002 | Protte | |
| 6,823,972 B2 | 11/2004 | Gmirya | |
| 7,083,142 B2 | 8/2006 | Scott | |
| 7,229,251 B2 * | 6/2007 | Bertolotti | B64C 1/00 416/128 |
| 7,621,480 B2 * | 11/2009 | Darrow, Jr. | B64C 1/00 244/130 |
| 8,181,902 B2 | 5/2012 | Schlunke | |
| 8,235,324 B1 | 8/2012 | Birch et al. | |
| 8,531,072 B2 | 9/2013 | Wishart | |
| 8,628,042 B2 | 1/2014 | Imbert et al. | |
| 8,844,880 B1 | 9/2014 | Corliss | |
| 8,851,415 B1 | 10/2014 | Lugg | |
| 8,931,732 B2 | 1/2015 | Sirohi et al. | |
| 8,948,928 B2 | 2/2015 | Alber et al. | |
| 9,004,395 B2 | 4/2015 | Botti | |
| 9,272,779 B2 | 3/2016 | Groenewald et al. | |
| 9,446,842 B2 | 9/2016 | Luyks | |
| 9,584,000 B2 | 2/2017 | Ruan et al. | |
| 9,725,179 B2 | 8/2017 | Aubert et al. | |
| 9,828,089 B2 | 11/2017 | Lauder et al. | |
| 10,053,207 B2 * | 8/2018 | Cox | B64C 27/04 |
| 10,116,187 B1 | 10/2018 | Wishart | |
| 2009/0140095 A1 * | 6/2009 | Sirohi | B64C 27/22 244/17.19 |
| 2010/0209242 A1 | 8/2010 | Popelka et al. | |
| 2011/0015034 A1 | 1/2011 | Ehinger et al. | |
| 2012/0074820 A1 | 3/2012 | Takeuchi | |
| 2013/0126669 A1 | 5/2013 | Hamann et al. | |
| 2013/0170985 A1 | 7/2013 | Altmikus et al. | |
| 2014/0302938 A1 | 10/2014 | Lidak | |
| 2014/0316608 A1 | 10/2014 | Alber et al. | |
| 2015/0093272 A1 | 4/2015 | Komer et al. | |
| 2015/0203196 A1 * | 7/2015 | Heverly, II | B64C 27/001 701/3 |
| 2017/0040870 A1 | 2/2017 | Ballauf | |
| 2017/0167317 A1 | 6/2017 | Lee et al. | |
| 2017/0253328 A1 | 9/2017 | Wang | |
| 2017/0297689 A1 * | 10/2017 | Lauder | B64C 27/14 |
| 2018/0002005 A1 | 1/2018 | Groenewald | |
| 2018/0105263 A1 * | 4/2018 | Lauder | H02K 16/00 |
| 2019/0023383 A1 | 1/2019 | Lauder | |
| 2019/0210717 A1 | 7/2019 | Lauder | |

FOREIGN PATENT DOCUMENTS

| | | |
|---|---|---|
| GB | 2360752 A | 10/2001 |
| JP | 4742390 B2 | 8/2011 |
| JP | 2014149075 A | 8/2014 |
| WO | 2005100154 A1 | 10/2005 |
| WO | 2016128330 A1 | 8/2016 |

OTHER PUBLICATIONS

Timothy Fred Lauder, U.S. Appl. No. 62/244,361, filed Oct. 21, 2015; Provisional Application Titled: Electric Propulsion System for a Rotary Wing Aircraft.

Timothy Fred Lauder, U.S. Appl. No. 15/010,970, filed Jan. 29, 2016; Non-Provisional Application Titled: Rotor Drive Systems for Rotorcraft.

Timothy Fred Lauder, U.S. Appl. No. 15/295,258, filed Oct. 17, 2016; Non-Provisional Application Titled: Electric Propulsion System for a Rotary Wing Aircraft.

Timothy Fred Lauder, U.S. Appl. No. 15/296,625, filed Oct. 18, 2016; Non-Provisional Application Titled: Electric Propulsion System for a Rotary Wing Aircraft.

Non-Final Office Action, U.S. Appl. No. 15/295,258, filed Oct. 17, 2016; An Electric Propulsion System for a Rotary Wing Aircraft; dated Dec. 2, 2019, pp. 1-48.

Notice of Allowance; U.S. Appl. No. 15/655,665, filed Jul. 20, 2017; Tilting Coaxial Rotor for a Rotary Wing Aircraft; dated Dec. 11, 2019, pp. 1-26.

* cited by examiner

ELECTRIC POWERED DIRECT DRIVE ROTOR MOTOR

BACKGROUND

The present disclosure relates to a rotary wing aircraft, and more particularly, to a rotary wing aircraft having an electric propulsion system.

Conventional rotary-wing aircraft typically utilize a mechanical drive train to transmit power from one or more engines to drive main and tail rotor systems. The helicopter mechanical drive train may include a main rotor gearbox, an intermediate gearbox, a tail rotor gearbox and their interconnecting shafts. The main rotor gearbox converts the high speed input from each engine to a low speed output for the main rotor system. The main rotor gearbox may also provide power take-offs to drive an anti-torque system, a hydraulic system and other such systems. Elimination of the main gearbox and hydraulic systems may result in a significant reduction in aircraft weight and maintenance requirements.

BRIEF DESCRIPTION

According to an embodiment, an electric propulsion system includes a static mast defining an axis of rotation and a stationary rotor hub assembly coupled to the static mast. A rotating system is rotatably mounted to the stationary rotor hub assembly. The electric propulsion system additionally includes an electric motor including a stator assembly associated with the rotor hub assembly and a rotor assembly associated with the rotating system.

In addition to one or more of the features described above, or as an alternative, in further embodiments the rotor hub assembly includes a first rotor hub and a second rotor hub, the first rotor hub and the second rotor hub being positioned to define a gap there between, the rotating system being disposed within the gap.

In addition to one or more of the features described above, or as an alternative, in further embodiments the rotating system includes a rotor head associated with an over-running clutch.

In addition to one or more of the features described above, or as an alternative, in further embodiments the rotor assembly is driven by the over-running clutch.

In addition to one or more of the features described above, or as an alternative, in further embodiments comprising a bearing system disposed between the static mast and the rotor hub assembly, wherein the bearing system allows the rotating system to articulate relative to the mast.

In addition to one or more of the features described above, or as an alternative, in further embodiments comprising a movable mast disposed between the bearing system and the rotor hub assembly, the movable mast being generally concentric with the static mast.

In addition to one or more of the features described above, or as an alternative, in further embodiments comprising a fairing assembly surrounding an exterior of the rotor hub assembly.

In addition to one or more of the features described above, or as an alternative, in further embodiments the stator assembly includes at least one electromagnetic coil arranged circumferentially about the static mast and supported by the rotor hub assembly.

In addition to one or more of the features described above, or as an alternative, in further embodiments the rotor assembly includes at least one permanent magnet arranged circumferentially about the static mast and supported by the rotating system, the at least one permanent magnet being generally aligned with the at least one electromagnetic coil.

In addition to one or more of the features described above, or as an alternative, in further embodiments comprising a power generation system distinct from the electric motor, the power generation system including a power generating stator assembly associated with the rotor hub assembly and a power generating rotor assembly associated with the rotating system.

In addition to one or more of the features described above, or as an alternative, in further embodiments the power generating stator assembly includes a plurality of permanent magnets and the power generating rotor assembly includes a plurality of electromagnetic coils, the plurality of permanent magnets and the plurality of electromagnetic coils being in generally vertical alignment and spaced about the periphery of the static mast.

In addition to one or more of the features described above, or as an alternative, in further embodiments the plurality of permanent magnets are spaced about an outboard end of the rotor hub assembly.

In addition to one or more of the features described above, or as an alternative, in further embodiments the rotating system further comprises a rotor head and the plurality of electromagnetic coils are spaced about at least one surface of the rotor head.

In addition to one or more of the features described above, or as an alternative, in further embodiments comprising at least one electromechanical actuator, wherein power for the electromechanical actuator is supplied by the power generation system.

According to another embodiment, a rotary wing aircraft includes an airframe, a rotor system. The rotor system includes a static mast engaged to the airframe and extending along an axis, a stationary rotor hub assembly, a rotating system connected to the rotor hub assembly, and an electric motor housed within the rotor system. The electric motor includes a stator assembly coupled to the rotor hub assembly and a rotor assembly configured to rotate with respect to the stator assembly. A plurality of blades project radially outward from the rotor assembly.

In addition to one or more of the features described above, or as an alternative, in further embodiments comprising a bearing system disposed between the rotor hub assembly and the static mast, wherein the bearing system allows the rotor hub assembly to articulate relative to the static mast.

In addition to one or more of the features described above, or as an alternative, in further embodiments the rotating system includes a rotor head connected to an over-running clutch.

In addition to one or more of the features described above, or as an alternative, in further embodiments the rotor hub assembly includes a first rotor hub and a second rotor hub separated from one another to define a gap, the rotating system being positioned within the gap.

In addition to one or more of the features described above, or as an alternative, in further embodiments comprising a power generation system operable to generate power as the rotating system rotates about an axis.

In addition to one or more of the features described above, or as an alternative, in further embodiment's power generated by the power generation system is used to operate an electromechanical actuator associated with the rotating system.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
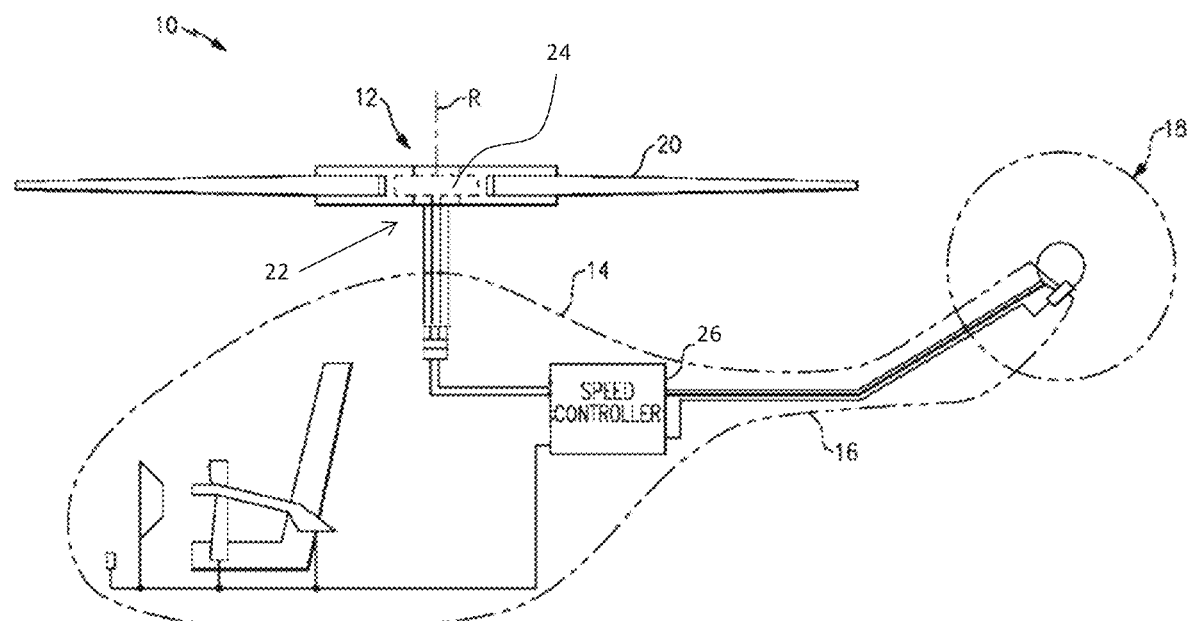
FIG. 1 is a schematic diagram of an example of a vertical takeoff and landing (VTOL) rotary wing aircraft.
Figure 2:
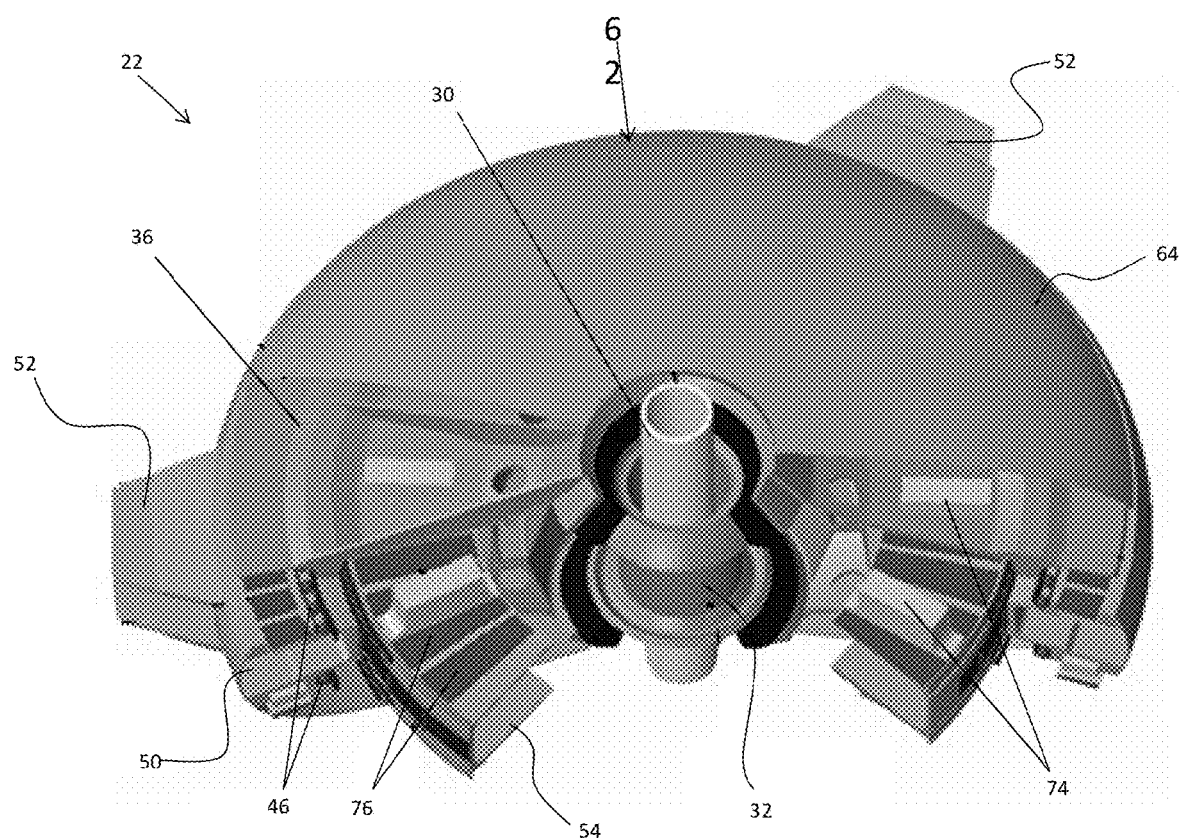
FIG. 2 is a perspective view of a propulsion system according to an embodiment.
Figure 3:
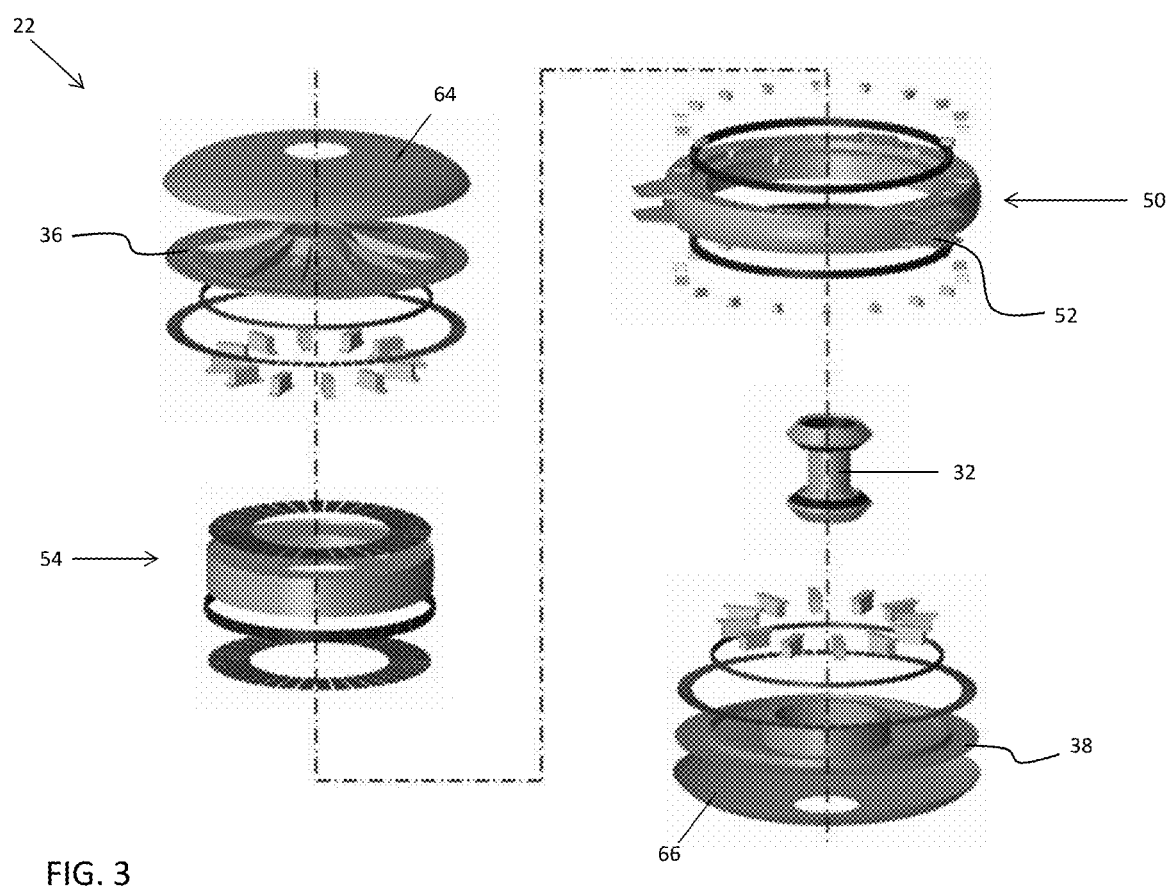
FIG. 3 is an exploded view of the propulsion system of FIG. 2 according to an embodiment.

FIG. 1 schematically illustrates an example of a vertical takeoff and landing (VTOL) rotary wing aircraft 10. The aircraft 10 in the non-limiting embodiment of FIG. 1 includes a main rotor system 12 supported by an airframe 14 having an extending tail 16 which mounts an anti-torque system 18, such as a tail rotor system. The main rotor system 12 includes a plurality of rotor blades 20 configured to rotate about an axis of rotation R. Although a particular helicopter configuration is schematically illustrated in the disclosed non-limiting embodiments, other configurations and/or machines, such as Unmanned Air Vehicles, high speed compound rotary wing aircraft with supplemental translational thrust systems, dual counter-rotating, coaxial rotor system aircraft, tilt-rotors and tilt-wing aircraft in either manned or unmanned configurations will also benefit here from.

At least one of the main rotor system 12 and the anti-torque system 18 is configured as an electric propulsion system 22 that generally integrates an electric motor 24 into the rotor of the rotary-wing aircraft 10. The electric motor 24 of the propulsion system 22 may be controlled by an electronic speed controller 26 over a wide range of speeds in response to a flight control system (not shown).

An example of a propulsion system 22 of an aircraft 10, such as a main rotor system 12 of a rotary wing aircraft 10 for example, is illustrated in more detail in FIGS. 2-8. The propulsion system 22 includes a static mast 30 that is generally stationary relative to the airframe 14 of the aircraft 10. The static mast 30 defines, but does not rotate about an axis of rotation R.

An elastomeric gimbal 32 is coupled to the static mast 30, between the static mast 30, for example between the static mast 30 and a stationary rotor hub assembly 34. The elastomeric gimbal 32 is mounted concentrically with the static mast 30, such as via one or more interlocking splines for example, and is configured to allow the rotor hub assembly 34, to pivot or articulate relative to the static mast 30. The gimbal 32 provides additional degrees of freedom of movement and allows for a semi-rigid in-plane design resulting in reduced flight loads, component size, and vehicle weight. In addition, the gimbal 32 reduces the maintenance and operating costs associated with conventional bearing systems.

Figure 10:
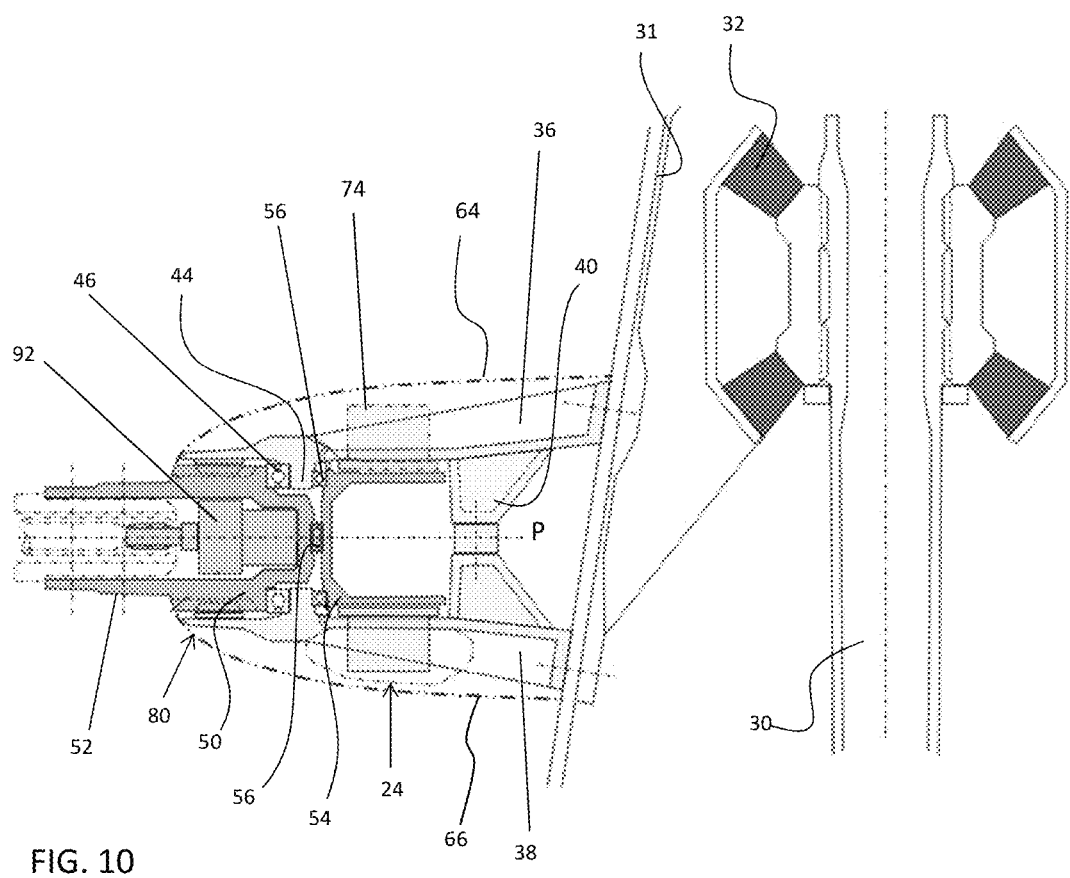
FIG. 10 is a cross-sectional view of the propulsion system according to an embodiment.

In an embodiment, the portion of the rotor hub assembly 34 directly adjacent the static mast 30 is contoured to define at least one bearing interface surface 33 adapted to abut a corresponding surface of the gimbal 32. Alternatively, as shown in FIG. 10, a movable mast 31 may be positioned between the rotor hub assembly 34 and the gimbal 32. The movable mast 31 does not rotate about the axis of rotation R; however, the movable mast 40 is able to pivot or articulate relative to the static mast 30 and the airframe 14 via the elastomeric bearing 32. One or more actuators (not shown) may be operable to move the mast 40 relative to the static mast 30.

Figure 4:
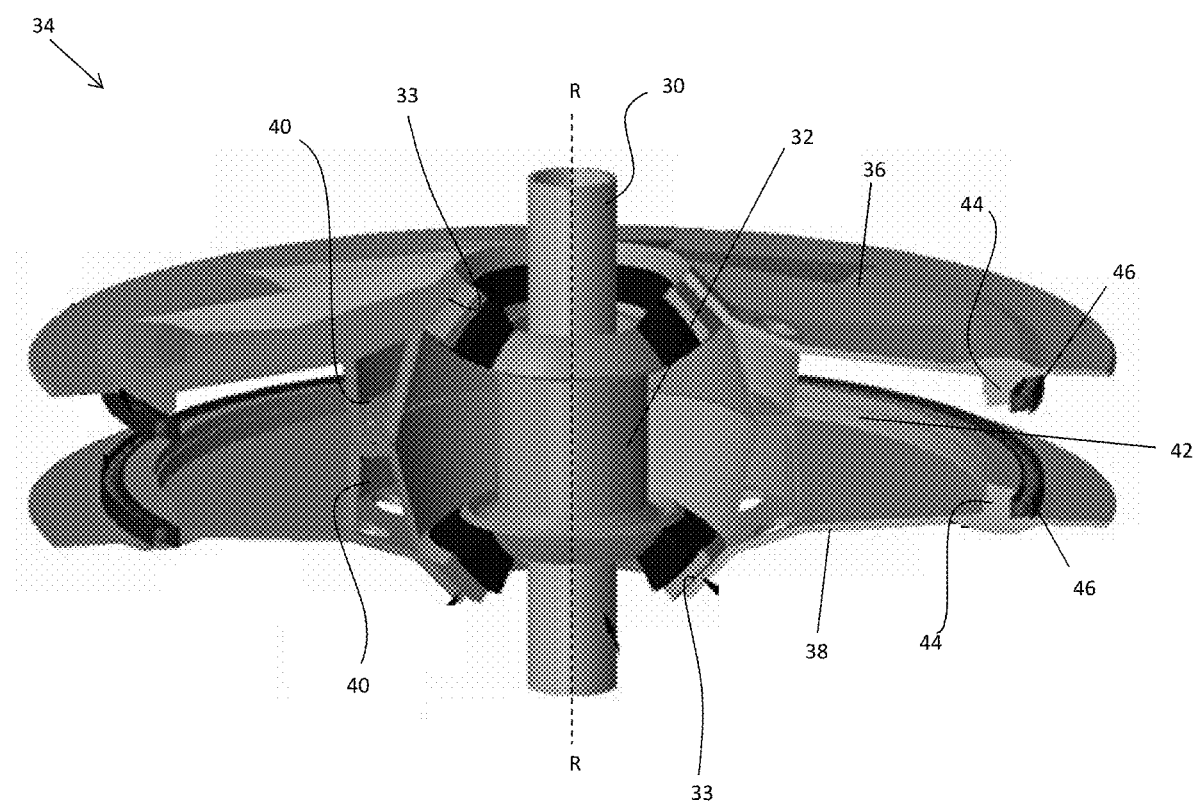
FIG. 4 is a perspective, partially cut away view of a stationary rotor hub assembly of the propulsion system according to an embodiment.
Figure 5:
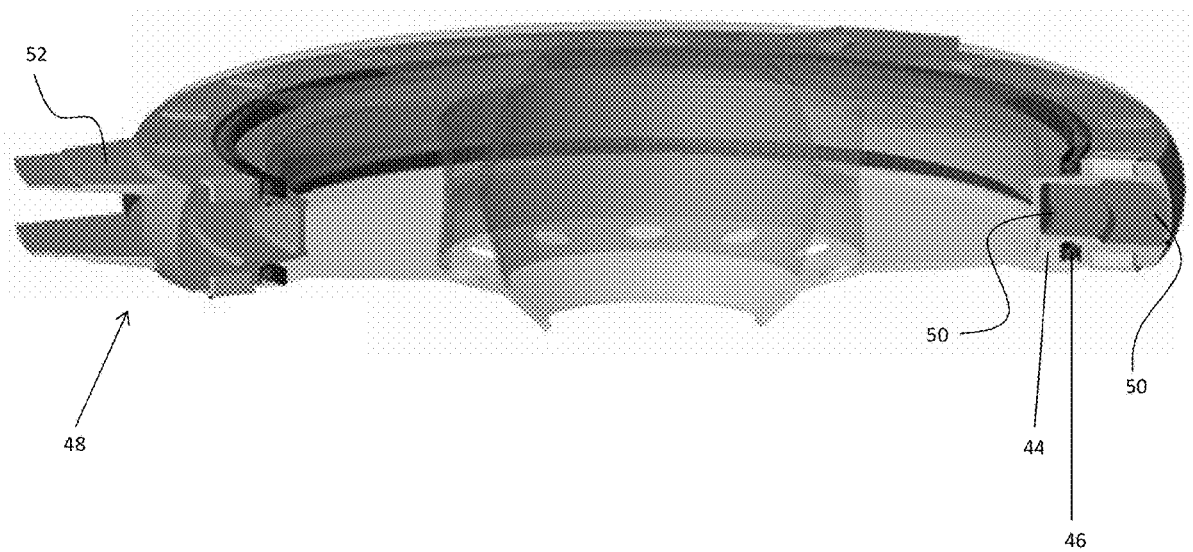
FIG. 5 is a perspective, partially cut away view of a rotating system of the propulsion system according to an embodiment.
Figure 6:
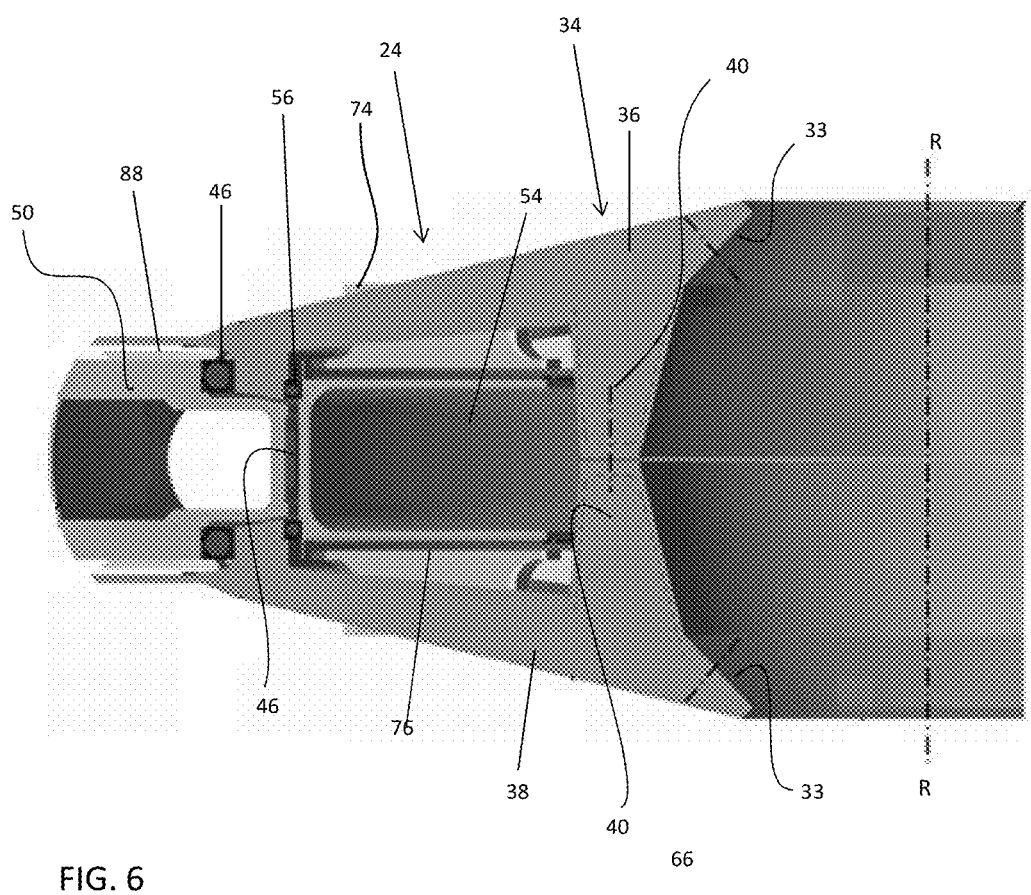
FIG. 6 is a cross-sectional view of a portion of the propulsion system of FIG. 2 according to an embodiment.
Figure 7:
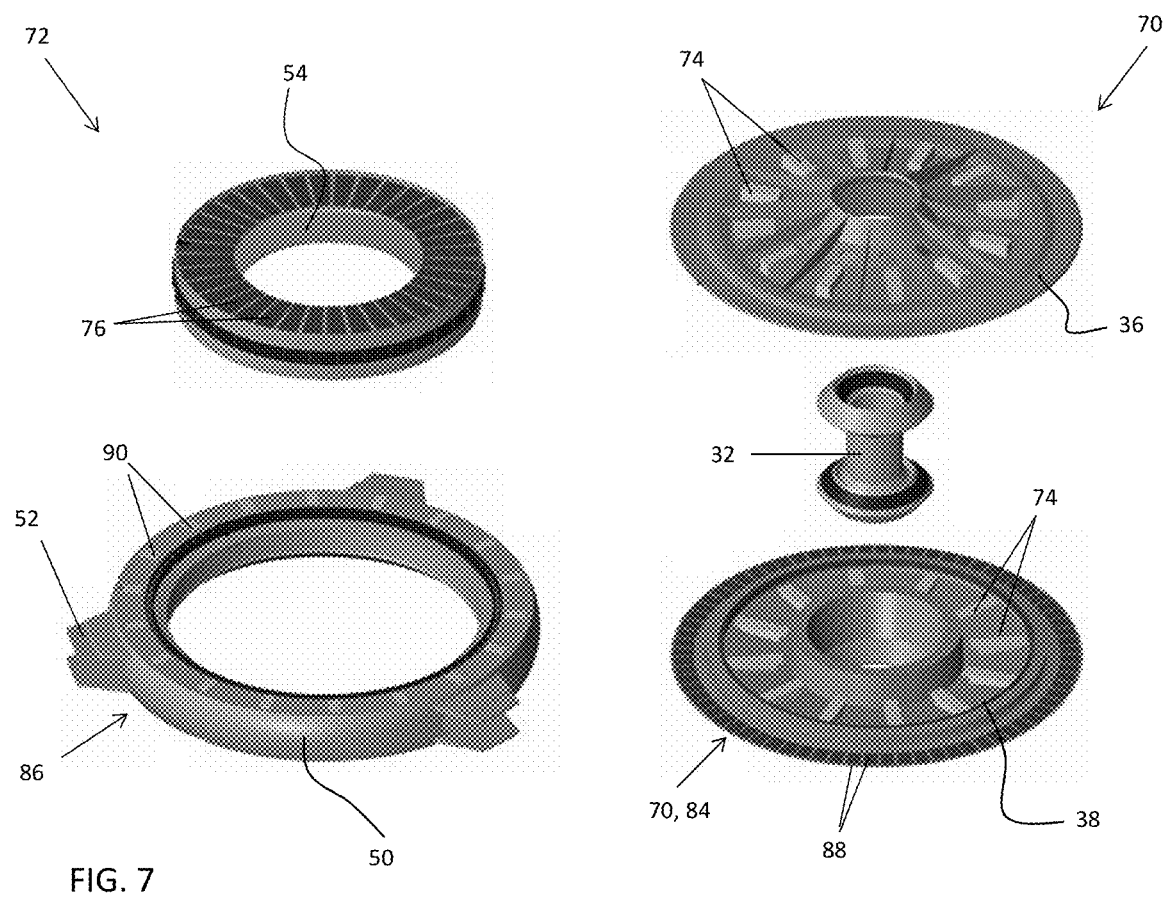
FIG. 7 is a perspective view of various components that define the electric motor of the propulsion system according to an embodiment.
Figure 8:
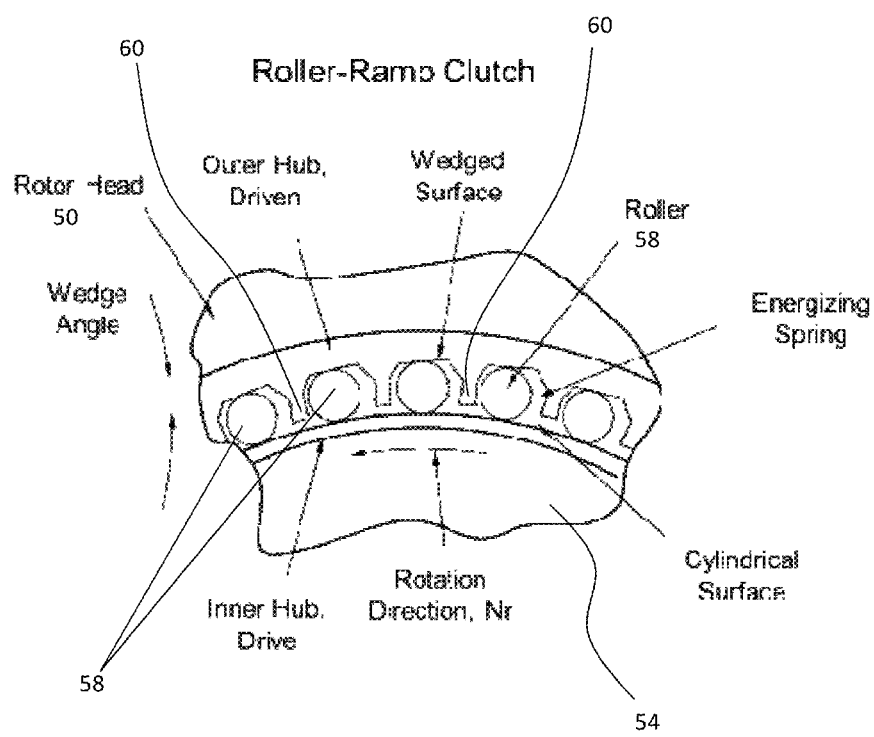
FIG. 8 is a schematic diagram of the interface between the rotor head and the over-running clutch of the rotating system according to an embodiment.

With reference now to FIG. 4, in the illustrated, non-limiting embodiment, the stationary rotor hub assembly 34 includes a first, upper rotor hub 36 and a second, lower rotor hub 38. The second rotor hub 38 is complementary to the first rotor hub 36. In an embodiment, the first rotor hub 36 and the second rotor hub 38 are substantially identical and/or are symmetrical about a plane P. Within the rotor hub assembly 34, the first and second rotor hubs 36, 38 are rotated 180 degrees relative to one another such that the rotor hubs 36, 38 generally face one another.

As shown in the FIGS., each of the first rotor hub 36 and the second rotor hub 38 includes a first rotor hub protrusion 40 extending perpendicularly from an inwardly facing surface of the rotor hub, 36, 38 towards the opposite rotor hub 36, 38. The protrusions 40 are generally sizes such the distal end of the protrusion 40 of the first rotor hub 36 directly contacts the end of the protrusion 40 extending from the second rotor hub 38. As a result of this engagement between the first and second protrusions and the configuration of the rotor hubs 36, 38, a gap or clearance 42 is formed between the first rotor hub 38 and the second rotor hub 38 outboard of the protrusions 40.

A second rotor hub protrusion 44 may extend from an inward facing surface of the rotor hubs 36, 38 at a location between the first protrusion 40 and the outer periphery of the rotor hub assembly 34. The second rotor hub protrusion 44 of each rotor hub 36, 38 is adapted to support a bearing 46 thereon. In an embodiment, the bearing 46 is a duplex bearing having a race aligned with each of the protrusions 44. As a result, the height of the protrusion 44 may be selected to be generally equal to or slightly larger than a height of the bearing 46.

The propulsion system 22 additionally includes a rotating system 48 rotatable relative to the stationary rotor hub assembly 34 about the axis R defined by the static mast 30. The rotating system 48 includes a rigid ring-shaped rotor head 50 mounted concentrically with the hub assembly 34. The rotor head 50 is configured to couple an inboard end of each rotor blade 20 to the static mast 30. As shown, a blade attachment cuff 52 configured to couple to a corresponding rotor blade 20 may be integrally formed with and extend generally outwardly from the outer periphery of the rotor head 50. However, embodiments where the rotating system 48 comprises a plurality of individual yokes spaced about the periphery of the static mast 30 and associated with the plurality of rotor blades 20 are also contemplated herein. As shown in the FIGS., the rotor head 50 is positioned generally adjacent the outboard end of the rotor hub assembly 34 between the first rotor hub 36 and the second rotor hub 38. The rotor head 34 is supported within the rotor hub assembly 34 by the at least one bearing 46 at a position adjacent the second protrusions 44.

The rotating system 48 of the propulsion system 22 additionally includes an over-running clutch 54. In an embodiment, the overrunning clutch 54 is generally positioned within the gap 42 formed between the first rotor hub 36 and the second rotor hub 38 between the first protrusion 40 and the second protrusion 44. One or more bearings 56, such as a duplex bearing set arranged adjacent a corresponding surface of the second protrusion 44, support the over-running clutch 54 within the rotor hub assembly 34. In an embodiment, the overrunning clutch 54 is mounted directly adjacent an in-line with a portion of the rotor head 50. As a result, a direct load path for torque transfer exists between the over-running clutch 54 and the rotor head 50. In the illustrated, non-limiting embodiment, the overrunning clutch 54 is a ramp-roller overrunning clutch. Accordingly, a plurality of rollers 58 is mounted at an interface between the clutch 54 and the rotor head 50 about the periphery of the clutch 54. In an embodiment, the surface of the rotor head 50 adjacent the clutch 54 includes one or more features 60 configured to cooperate with the clutch 54 to transmit rotation between the clutch 54 and the rotor head 50.

A fairing assembly 62 generally surrounds the exterior of the stationary rotor hub assembly 34 to provide environmentally protect to the propulsion system 22 and to enhance the aerodynamic properties thereof, such as by reducing the drag thereof. The fairing assembly 62 may include a plurality of complementary portions, such as a first, upper fairing 64 and a second, lower fairing 66. In an embodiment, the upper and lower fairings 64, 66 are substantially identical and symmetrical about the plane P extending through the interface of the first protrusions 40 and normal to the axis of rotation R (see FIG. 10). The outboard ends of the upper and lower fairings 64, 66 are separated from one another to define a gap within which the rotating system 48 and the rotor blades 20 coupled thereto can rotate relative to the static mast 30.

The electric motor 24 configured to drive rotation of the plurality of rotor blades 20 about the axis R is integrated into the stationary rotor hub assembly 34 and the rotating system 48. The electric motor 24 includes a stator assembly 70 rigidly coupled to the static mast 30, and a rotor assembly 72 configured to rotate about the axis R, best shown in FIG. 7. The stator assembly 70 includes one or more electromagnetic coils 74 affixed to at least one surface of the rotor hub assembly 34. Wiring (not shown) associated with the at least one electromagnetic coil 72 may extend through a hollow interior of the static mast 30 and along a corresponding rotor hub 36, 38.

In the illustrated, non-limiting embodiment, electromagnetic coils 74 are affixed to both the first rotor hub 36 and the second rotor hub 38 to form a dual motor arrangement. However, embodiments where only one of the first and second rotor hubs 36, 38 includes electromagnetic coils 74 are also contemplated herein. The total number of electromagnetic coils 74 included in the motor 24 may vary based on the desired performance of the propulsion system 22. The electromagnetic coils 74 are spaced circumferentially about the static mast 30 and are generally located at a position spaced radially outward from the static mast 30, such as in vertical alignment with the over-running clutch 54 for example.

In embodiments of the propulsion system 22 having a dual motor arrangement, the electromagnetic coils 74 mounted to the first rotor hub 36 and the second rotor hub 38 portion may be substantially identical, or alternatively, may be different. In addition, the one or more of the electromagnetic coils 74 mounted to the first rotor hub 36 may be vertically aligned with one or more electromagnetic coils 74 mounted to the second rotor hub 38. Alternatively, the one or more electromagnetic coils 74 mounted to the first rotor hub 36 may be staggered relative to the electromagnetic coils 74 mounted to the second rotor hub 38.

The rotor assembly 72 of the motor 24 includes one or more permanent magnets 76 mounted to the rotating system 48, and more specifically, to the over-running clutch 54. As shown, the magnets 76 are mounted to the over-running clutch 54 horizontally and are positioned such that the one or more magnets 76 are vertically aligned with the at least one electromagnetic coil 74 of the stator assembly 70. The spatial positioning between the electromagnetic coils 74 of the stator assembly 70 and the adjacent permanent magnets 76 of the rotor assembly 72 is defined by the clearance 42 between the upper and lower rotor hubs 36, 38 and the bearings 46, 56 positioned therein. In an embodiment, the magnets 76 are fixedly or removably mounted to at least one of an upper surface and a lower surface of the over-running clutch 54. The magnets 76 are generally circumferentially positioned about the over-running clutch 54, concentric with the static mast 30. The magnets 76 may, but need not be, equidistantly spaced about the over-running clutch 54.

The rotor assembly 72 is configured to rotate with respect to the stator assembly 70 and the static mast 30 as the magnets 76 of the rotor assembly 72 react with an induced magnetic field generated when the electromagnetic coils 74 of the stator assembly 70 are energized. As the over-running clutch 54 rotates about the axis R defined by the static mast 30, an energizing spring force pinches the rollers 58 between the features 60 of the rotor head 54 and the clutch 54. As a result of this engagement, torque is transferred from the clutch 54 to the rotor head 54. During operation, all electrical inputs necessary to power the motor 24 resides in the fixed frame of references, thereby eliminating the need for stationary to rotating power transfer couplings, such as slip rings. The motor electronic control unit (ECU), illustrated schematically at 78 in FIG. 9, is also located in the fixed frame and is operable to control application of electrical energy and signal to the stationary coils, thereby providing torque and speed control.

Figure 9:
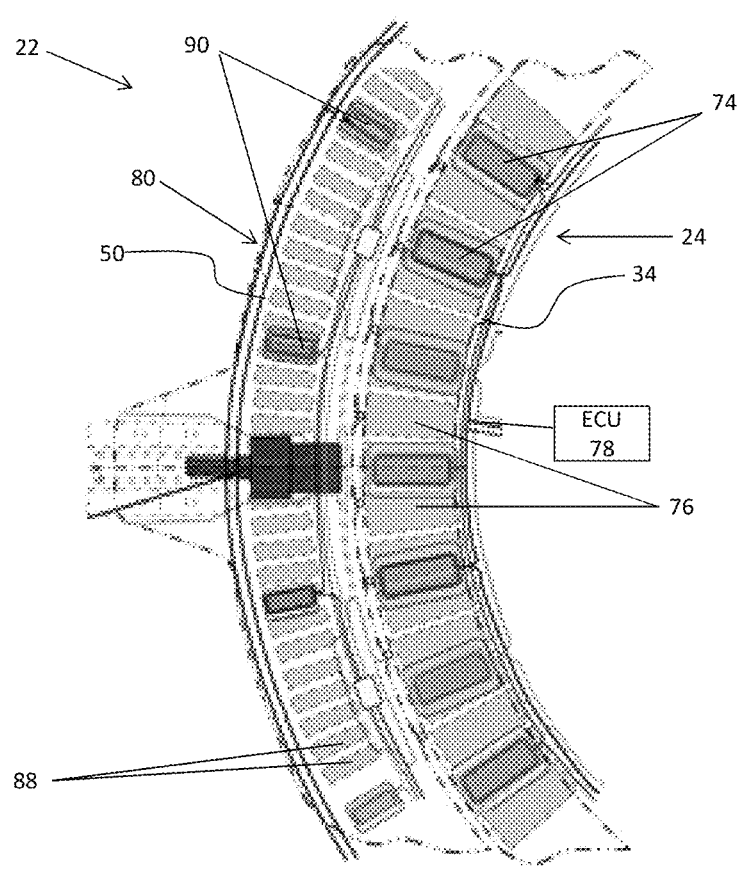
FIG. 9 is a top view of a portion of the propulsion system of FIG. 2 according to an embodiment.

With reference now to FIG. 9, in an embodiment, the propulsion system 22 additionally includes a power generation system 80. As shown, the power generation system 80 includes a generator stator 84 and a generator rotor 86. In the illustrated, non-limiting embodiment, the generator stator 84 is integrally formed with the rotor hub assembly 34 and includes one or more permanent magnets 88 affixed to at least one surface thereof. As shown, the plurality of permanent magnets 88 are located adjacent an outboard edge of at least one of the upper rotor hub 36 and the lower rotor hub 38. The generator rotor 86 additionally includes one or more electromagnetic coils 90 mounted to the rotating system 48. In the illustrated, non-limiting embodiment, the electromagnetic coils 90 are mounted to one or more surfaces of the rotor head 50 in generally vertical alignment with the permanent magnets 88.

As the electric motor 24 drives rotation of the rotating system 48 relative to the stationary rotor hub assembly 34, the permanent magnets 88 coupled to the rotor hub assembly 34 generate a magnetic field which induces an electrical current in the electromagnetic coils 90 mounted to the rotor head 50. This current induced in the electromagnetic coils 90 of the rotating system 48 may then be used to power one or more components located within the rotating frame of the propulsion system 22, such as an electromechanical actuator configured to control rotation of a corresponding rotor blade about a pitch axis. In such embodiments, the electrical power generation of the electromechanical actuator is self-contained within the rotor head 50, and a wireless system is used for lower power transfer and for communication with the electromechanical actuator.

Benefits of the present disclosure may include but are not limited to a reduction in weight, fewer parts and lower costs relative to more traditional aircrafts. The present disclosure eliminates more traditional motor housing and mounting structures and replaces the rotating shaft with a structurally efficient static mast. Moreover, traditional gearboxes are eliminated.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An electric propulsion system comprising:
   a static mast defining an axis of rotation;
   a stationary rotor hub assembly coupled to the static mast;
   a rotating system rotatably mounted to the stationary rotor hub assembly; and
   an electric motor including a stator assembly integrated with the rotor hub assembly and a rotor assembly integrated with the rotating system.

2. The electric propulsion system of claim 1, wherein the rotor hub assembly includes a first rotor hub and a second rotor hub, the first rotor hub and the second rotor hub being positioned to define a gap there between, the rotating system being disposed within the gap.

3. The electric propulsion system of claim 1, wherein the rotating system includes a rotor head operably coupled with an over-running clutch.

4. The electric propulsion system of claim 3, wherein the rotor assembly is driven by the over-running clutch.

5. The electric propulsion system of claim 1, further comprising a bearing system disposed between the static mast and the rotor hub assembly, wherein the bearing system allows the rotating system to articulate relative to the mast.

6. The electric propulsion system of claim 5, further comprising a movable mast disposed between the bearing system and the rotor hub assembly, the movable mast being generally concentric with the static mast.

7. The electric propulsion system of claim 1, further comprising a fairing assembly surrounding an exterior of the rotor hub assembly.

8. The electric propulsion system of claim 1, wherein the stator assembly includes at least one electromagnetic coil arranged circumferentially about the static mast and supported by the rotor hub assembly.

9. The electric propulsion system of claim 8, wherein the rotor assembly includes at least one permanent magnet arranged circumferentially about the static mast and supported by the rotating system, the at least one permanent magnet being generally aligned with the at least one electromagnetic coil.

10. The electric propulsion system of claim 1, further comprising a power generation system distinct from the electric motor, the power generation system including a power generating stator assembly associated with the rotor hub assembly and a power generating rotor assembly associated with the rotating system.

11. The electric propulsion system of claim 10, wherein the power generating stator assembly includes a plurality of permanent magnets and the power generating rotor assembly includes a plurality of electromagnetic coils, the plurality of permanent magnets and the plurality of electromagnetic coils being in generally vertical alignment and spaced about the periphery of the static mast.

12. The electric propulsion system of claim 11, wherein the plurality of permanent magnets are spaced about an outboard end of the rotor hub assembly.

13. The electric propulsion system of claim 11, wherein the rotating system further comprises a rotor head and the plurality of electromagnetic coils are spaced about at least one surface of the rotor head.

14. The electric propulsion system of claim 10, further comprising at least one electromechanical actuator, wherein power for the electromechanical actuator is supplied by the power generation system.

15. A rotary wing aircraft comprising:
   an airframe;
   a rotor system including:
      a static mast engaged to the airframe and extending along an axis;
      a stationary rotor hub assembly;
      a rotating system rotatably connected to the rotor hub assembly;
      an electric motor housed within the rotor system, the electric motor including a stator assembly coupled to the rotor hub assembly and a rotor assembly connected to the rotating system, the rotor system being configured to rotate with respect to the stator assembly; and
      a plurality of rotor blades projecting radially outward from the rotor assembly.

16. The rotary wing aircraft according to claim 15, further comprising a bearing system disposed between the rotor hub assembly and the static mast, wherein the bearing system allows the rotor hub assembly to articulate relative to the static mast.

17. The rotary wing aircraft according to claim 15, wherein the rotating system includes a rotor head connected to an over-running clutch.

18. The rotary wing aircraft according to claim 17, wherein the rotor hub assembly includes a first rotor hub and a second rotor hub separated from one another to define a gap, the rotating system being positioned within the gap.

19. The rotary wing aircraft according to claim 15, further comprising a power generation system operable to generate power as the rotating system rotates about an axis.

20. The rotary wing aircraft according to claim 19, wherein power generated by the power generation system is used to operate an electromechanical actuator associated with the rotating system.

* * * * *